(12) United States Patent
Fujii et al.

(10) Patent No.: US 11,590,591 B2
(45) Date of Patent: Feb. 28, 2023

(54) PRESS DIE DESIGNING METHOD USING AN INDEX VALUE OBTAINED FROM TWO STRESS GRADIENTS IN SHEET THICKNESS DIRECTION AND GRADIENT OF SURFACE STRESS DISTRIBUTION IN DIRECTION

(71) Applicant: JFE STEEL CORPORATION, Tokyo (JP)

(72) Inventors: Kento Fujii, Tokyo (JP); Yusuke Fujii, Tokyo (JP); Yuji Yamasaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 459 days.

(21) Appl. No.: 16/649,866

(22) PCT Filed: Aug. 2, 2018

(86) PCT No.: PCT/JP2018/029131
§ 371 (c)(1),
(2) Date: Mar. 23, 2020

(87) PCT Pub. No.: WO2019/064922
PCT Pub. Date: Apr. 4, 2019

(65) Prior Publication Data
US 2020/0276658 A1    Sep. 3, 2020

(30) Foreign Application Priority Data

Sep. 26, 2017 (JP) .............................. JP2017-184706

(51) Int. Cl.
*G01N 3/28* (2006.01)
*G01N 3/24* (2006.01)
*B23D 15/06* (2006.01)

(52) U.S. Cl.
CPC ............... *B23D 15/06* (2013.01); *G01N 3/24* (2013.01); *G01N 3/28* (2013.01); *G01N 2203/0025* (2013.01); *G01N 2203/0062* (2013.01)

(58) Field of Classification Search
CPC .. G01N 3/28; G01N 3/08; G01N 3/20; G01N 3/00; G01N 3/32; B23D 15/06;
(Continued)

(56) References Cited

U.S. PATENT DOCUMENTS 9,333,549 B2 * 5/2016 Fujii ..................... B21D 22/00
9,874,504 B2   1/2018 Yonemura et al.
(Continued)

FOREIGN PATENT DOCUMENTS

CN    104010745 A    8/2014
CN    105574301 A    5/2016
(Continued)

OTHER PUBLICATIONS

Jul. 14, 2020 Office Action issued in Japanese Patent Application No. 2019-544372.
(Continued)

*Primary Examiner* — Brandi N Hopkins
(74) *Attorney, Agent, or Firm* — Oliff PLC

(57) ABSTRACT

To prevent a crack from occurring on a sheared end face due to press forming, a technology is provided for evaluating and predicting a crack limit of the sheared end face of a metal sheet and determining press forming conditions. In a deformation limit evaluation method for, when deforming by press forming a metal sheet subjected to shearing, evaluating a deformation limit of the sheared end face of the metal sheet, the deformation limit is evaluated by an index value obtained from two stress gradients at an evaluation position among stress distributions occurring in the vicinity of the (Continued)

sheared end face of the metal sheet due to the press forming, which gradients are a stress gradient in a sheet thickness direction and a stress gradient in a direction away from the sheared end face.

7 Claims, 7 Drawing Sheets

(58) Field of Classification Search
CPC .......... B21D 5/01; B21D 22/00; B21D 22/20; B21D 22/02; B21D 28/16; B21D 28/00; B21D 22/26; Y02P 10/25; Y02T 10/82; G06F 30/00; G06F 17/5018; G06F 30/20; B30B 15/26; C21D 9/46; G01L 1/00; C22C 38/28; C22C 38/04; B23K 11/16
See application file for complete search history.

(56) References Cited

U.S. PATENT DOCUMENTS

| | | | |
|---|---|---|---|
| 9,953,115 B2 | 4/2018 | Sonobe et al. | |
| 2015/0231682 A1* | 8/2015 | Fujii | B21D 37/20 72/352 |
| 2015/0294043 A1 | 10/2015 | Sonobe et al. | |
| 2016/0161382 A1* | 6/2016 | Yonemura | G06F 30/20 73/851 |
| 2017/0140080 A1 | 5/2017 | Oetjens et al. | |
| 2018/0107772 A1 | 4/2018 | Shirakami et al. | |

FOREIGN PATENT DOCUMENTS

| | | |
|---|---|---|
| CN | 106457331 A | 2/2017 |
| CN | 106470776 A | 3/2017 |
| EP | 2 921 841 A1 | 9/2015 |
| EP | 3 016 009 A1 | 5/2016 |
| EP | 2 921 841 B1 | 2/2018 |
| JP | 2006-155254 A | 6/2006 |
| JP | 2010-069533 A | 4/2010 |
| JP | 2011-043452 A | 3/2011 |
| JP | 2011-140046 A | 7/2011 |
| JP | 2012-166251 A | 9/2012 |
| JP | 2014-115269 A | 6/2014 |
| WO | 2014/077060 A1 | 5/2014 |
| WO | 2014/208697 A1 | 12/2014 |

OTHER PUBLICATIONS

Morales-Palma et al., "Assessment of the effect of the through-thickness strain/stress gradient on the formability of stretch-bend metal sheets," Materials and Design, 2013, vol. 50, pp. 798-809.
Oct. 28, 2020 Extended Search Report issued in European Patent Application No. 18861608.0.
Mar. 31, 2020 International Preliminary Report on Patentability issued in International Patent Application No. PCT/JP2018/029131.
Feb. 24, 2021 Office Action issued in Chinese Patent Application No. 201880061927.2.
Oct. 30, 2018 International Search Report issued in International Patent Application No. PCT/JP2018/029131.
Jun. 15, 2022 Office Action issued in European Patent Application No. 18861608.0.
Situ et al. "Determination of Forming Limit Diagrams of Sheet Materials With a Hybrid Experimental-Numerical Approach". International Journal of Mechanical Sciences, vol. 53, 2011, pp. 707-719.

* cited by examiner

PRESS DIE DESIGNING METHOD USING AN INDEX VALUE OBTAINED FROM TWO STRESS GRADIENTS IN SHEET THICKNESS DIRECTION AND GRADIENT OF SURFACE STRESS DISTRIBUTION IN DIRECTION

TECHNICAL FIELD

The present invention relates to a technology for, when forming a metal sheet subjected to shearing by press forming, evaluating and predicting a crack that occurs on a sheared surface (a sheared end face) where bending deformation, tensile deformation, or a combined deformation of tensile deformation and bending deformation occurs. Additionally, the present invention is a technology that relates to a method for designing (determining) a die shape capable of suppressing cracks on the metal sheet on the basis of the above technology.

BACKGROUND ART

Automobiles are currently required to improve fuel efficiency by weight reduction and to improve safety against collision. This leads to a tendency to use high-strength steel sheets for auto parts to achieve both vehicle body weight reduction and passenger protection in collisions.

Cracking is one of forming defects in press forming of a high-strength steel sheet. In particular, a crack on an end face comprising a sheared surface subjected to shearing (hereinafter also referred to as sheared end face) is one of critical problems.

The crack on the sheared end face is roughly classified as a crack due to stretch flange deformation or a crack due to bending deformation. Regarding a stretch flange crack, for example, PTL 1 to PTL 3 disclose prediction methods. PTL 1 proposes a prediction method considering a strain gradient in an in-plane direction of a sheet and a prediction method considering a stress gradient in the in-plane direction of the sheet. PTL 2 proposes a method using a relationship between strain gradient, strain concentration, and fracture strain in stretch flange deformation. PTL 3 proposes a crack prediction method using a relationship between forming limit strain and strain gradients in an in-plane direction of a sheet and a sheet thickness direction.

On the other hand, no crack prediction method has been developed that relates to bending cracks on a sheared end face, and hence, there has been a desire to develop a method for predicting a crack on a sheared end face, including such bending cracks.

CITATION LIST

Patent Literature

PTL 1: JP 2010-69533 A
PTL 2: JP 2011-140046 A
PTL 3: JP 2014-115269 A

SUMMARY OF INVENTION

Technical Problem

The adoption of a high-strength steel sheet as a metal sheet for press forming has come to elicit cracking on a sheared end face due to stretch flange deformation and bending deformation when press forming.

The present invention has been made in view of the problem as described above. It is an object of the present invention to provide a technology for evaluating and predicting a crack limit of a sheared end face of a metal sheet and determining press forming conditions to prevent occurrence of a crack on the sheared end face due to press forming.

Solution to Problem

To solve the problem, one aspect of the present invention is a deformation limit evaluation method for, when deforming by press forming a metal sheet subjected to shearing, evaluating a deformation limit of a sheared surface of the metal sheet includes: evaluating the deformation limit by an index value obtained from gradients of two surface stress distributions at an evaluation position among stress distributions occurring in the vicinity of the sheared surface of the metal sheet due to the press forming, which gradients are a gradient of a surface stress distribution in a sheet thickness direction and a gradient of a surface stress distribution in a direction away from the sheared surface.

Advantageous Effects of Invention

According to one aspect of the present invention, deformation limit of the sheared end face of a metal sheet necessary to press form the targeted metal sheet can be accurately evaluated and predicted.

As a result of that, according to one aspect of the present invention, prediction can be accurately made as to whether the selection of metal sheets for use in press forming various kinds of parts, such as panel parts and structural and frame parts of automobiles, are appropriate or not, thereby enabling stable press forming and great contribution to reduction in defect rates of press-formed articles. In addition, according to one aspect of the present invention, the shape of a press die can be accurately predicted at a designing stage, which can contribute to shortening of a press die manufacturing period.

DESCRIPTION OF EMBODIMENTS

Next, embodiments of the present invention will be described with reference to the drawings.

Figure 1:
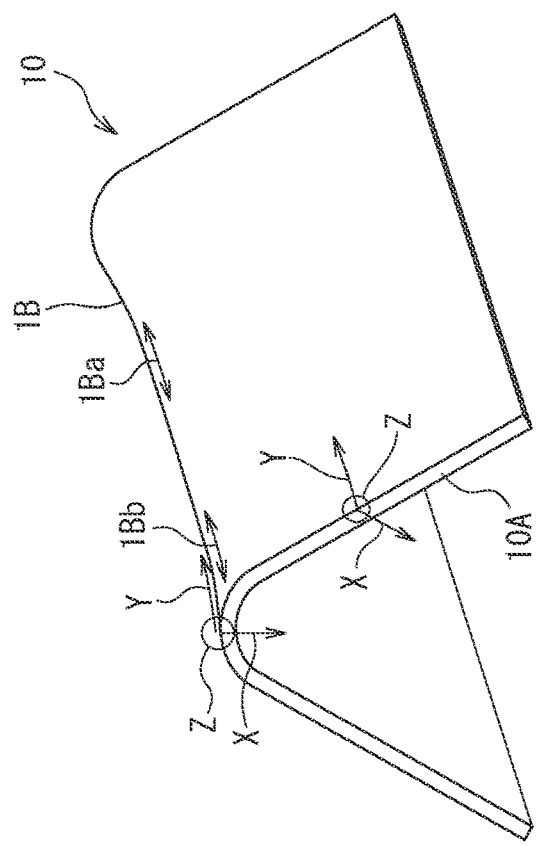
FIG. 1 is a diagram illustrating one example of a formed article formed by press forming including bending.

The following method according to the present embodiment is applicable even to a position where no bending deformation due to press forming occurs. FIG. 1 illustrates an example of a formed article 10 obtained by forming a metal sheet 1 by press forming including bending. FIG. 1 is the example of a case in which the metal sheet 1 is press formed into a saddle-like shape. In FIG. 1, reference sign 1B denotes a bending ridge line that is used as a bending line position when the metal sheet 1 is bent. Reference sign 10A denotes an end face (a sheared end face). Additionally, reference sign Z denotes an example of a place where a crack tends to occur in the vicinity of a boundary between a bending outer surface and the sheared end face.

As in FIG. 1, the above bending ridge line is a bending ridge line extending in a direction away from the sheared end face (the sheared surface) by bending (bending deformation). Hereinafter, the bending ridge line will be also referred to as first bending ridge line.

Note that reference sign Z put at a flat portion in FIG. 1 is illustrated together as an example of a case where an evaluation position is set on a sheared end face other than a bent portion.

Figure 2:
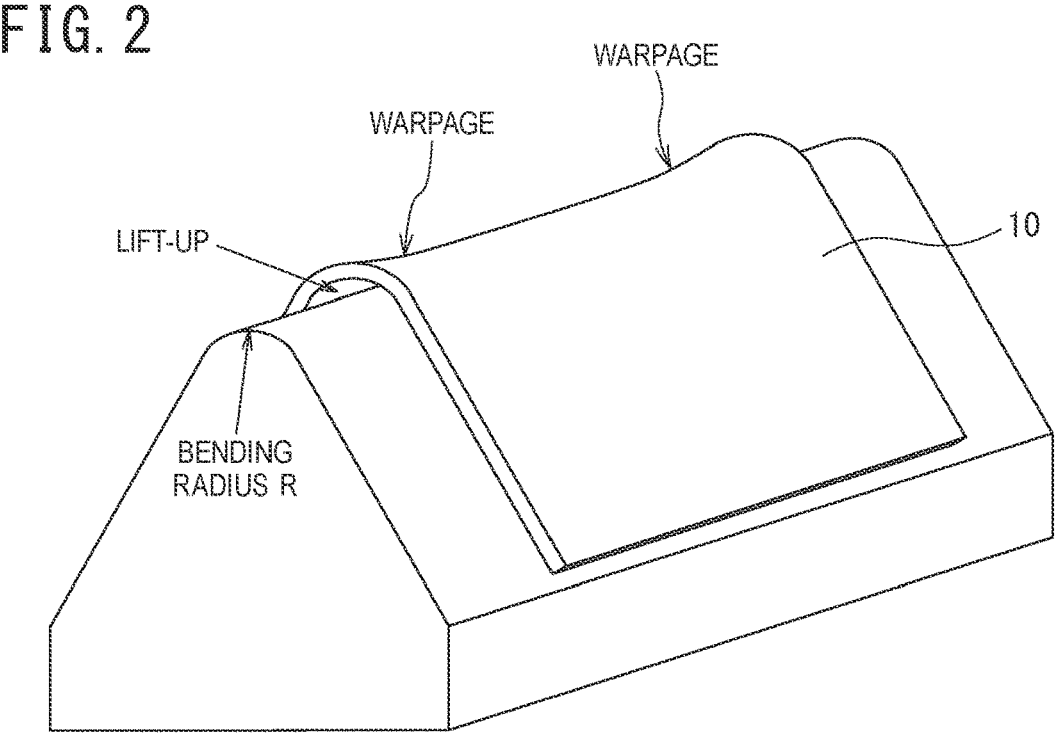
FIG. 2 is a diagram illustrating one example of a state where lift-up from a die has occurred due to the bending.

The present inventors conducted various investigations regarding press forming including bending, the result of which is as follows. When the metal sheet 1 is press formed, a warpage occurs at an end face of the metal sheet 1 at the time of the bending, and the end face side of the metal sheet 1 lifts up from a bending portion of the die, as illustrated in FIG. 2. Due to this, a center portion side (see reference sign 1Ba in FIG. 1) of the metal sheet 1 is subjected to bending deformation with a bending radius close to a bending radius R of the die, whereas the end face side (see reference sign 1Bb in FIG. 1) of the metal sheet 1 is subjected to bending deformation with a bending radius different from the bending radius R of the die.

Then, in the case of a combined deformation of bending deformation and tensile deformation, the lift-up of the end face of the metal sheet 1 from the die tends to reduce as the tensile deformation is increased. However, it has been found that when the metal sheet 1 has a strength of 590 MPa or more or a sheet thickness of 1.0 mm or more, a crack occurs before the lift-up of the end face 10A of the metal sheet 1 is eliminated. Accordingly, it has been shown that the crack prediction methods using the bending radius R of a die, as in the conventional technologies, cannot accurately predict a crack from the end face 10A.

Additionally, bending deformation causes a significantly large stress gradient in a sheet thickness direction X of the metal sheet 1, due to which a stress gradient in a direction along the end face 10A of the metal sheet 1 and a stress gradient in an in-plane direction orthogonal to the end face 10A become relatively less influential. This has indicated that, in the case of press forming including bending deformation, it is difficult to predict a crack on the end face 10A by the conventional prediction methods using them.

Furthermore, the present inventors expanded a press deformation position to be evaluated, and repeated various investigations regarding the occurrence of a crack on the sheared end face 10A at bending deformation positions (bending deformation and a combined deformation of bending deformation and tensile deformation) and a deformation position not subjected to bending deformation but subjected to tensile deformation in the press forming including bending described above. As a result, the inventors have found that when, under forming conditions causing a crack on the sheared end face 10A of the metal sheet 1, a maximum principal strain on the sheared end face 10A is defined as limit strain $\varepsilon_{limit}$ and a stress gradient in the vicinity of a crack occurrence portion is defined as $\Delta\sigma$, there is a strong correlation between the limit strain $\varepsilon_{limit}$ and the stress gradient $\Delta\sigma$ in the vicinity of the crack occurrence portion. In addition, the inventors obtained a finding that the occurrence of a crack on the sheared end face 10A can be predicted by comparing strain on the sheared end face 10A during press forming with the limit strain $\varepsilon_{limit}$ determined by the stress gradient.

On the basis of the above finding, the inventors have devised an evaluation method for evaluating a deformation limit of the sheared end face 10A of the metal sheet 1 from an index value obtained from gradients of two surface stress distributions: a gradient of a surface stress distribution in the sheet thickness direction X and a gradient of a surface stress distribution in a direction Y away from the sheared end face 10A (a direction parallel to a bending ridge line direction in the vicinity of bending deformation) in the vicinity Z of the crack occurrence portion, and an end face crack prediction method based on the evaluation method.

In other words, the method of the present embodiment evaluates the deformation limit from an index value obtained from gradients of two surface stress distributions at the evaluation position among stress distributions occurring in the vicinity of the sheared end face 10A of the metal sheet 1 due to press forming, which gradients are a gradient of a surface stress distribution in the sheet thickness direction X and a gradient of a surface stress distribution in the direction away from the sheared end face 10A. For example, from a relationship between the index value at the evaluation position and a forming limit strain, a deformation limit of the sheared end face 10A is evaluated, and a crack thereof is predicted.

In this case, when the intended press forming includes bending deformation, the gradient of the surface stress distribution in the direction away from the sheared end face 10A may be a gradient of a surface stress distribution in the direction parallel to the bending ridge line direction on the bending outer surface of the metal sheet 1.

Herein, the method of the present embodiment provides a technology for allowing deformation limit evaluation and crack prediction on the sheared end face 10A (the end face 10A formed by shearing) to be uniformly and accurately evaluated by one index value in all cases of a simple bending deformation, a combined deformation of tensile deformation and bending deformation, and a tensile deformation on the sheared end face 10A of the metal sheet 1 when press work is carried out. The method of the present embodiment is also intended for the sheared end face 10A at a press work position that does not include bending deformation.
(Regarding Index Value)

A description will be given of an index value for use in the evaluation that evaluates the deformation limit of the sheared end face 10A of the metal plate 1 used in the present embodiment and in the prediction of end face cracking based on the evaluation.

The index value of the present embodiment is a value obtained from, as variables, the gradients of the two surface stress distributions including the gradient of the surface stress distribution in the sheet thickness direction X and the gradient of the surface stress distribution in the direction away from the sheared end face 10A in the vicinity Z of the crack occurrence portion.

Note that the gradient of the surface stress distribution is also simply referred to as stress gradient, and the stress gradient in the direction Y away from the sheared end face 10A is also referred to as stress gradient in the in-plane direction.

The direction away from the sheared end face 10A is defined as, for example, a normal direction of the sheared end face 10A or a direction orthogonal to an edge line of the end face (see FIG. 1). The direction away from the sheared end face 10A may be a direction parallel to a closest bending ridge line direction.

The stress gradient in the direction away from the sheared end face 10A at a deformation position where bending deformation is applied is a stress gradient of a stress distribution that occurs near a boundary between the bending outer surface of the metal sheet 1 subjected to bending and the sheared end face 10A, which is a stress gradient in the direction parallel to the closest bending ridge line direction. The bending outer surface is the surface of a side that is deformed into a protruding shape by bending.

The index value is represented by a function of the following Equation (1) using, as two variables, a stress gradient $\Delta\sigma_{thickness}$ in the sheet thickness direction X and a stress gradient $\Delta\sigma_{in\text{-}plane}$ in the in-plane direction.

In the present embodiment, a combined stress $\Delta\sigma_{combine}$ is an index value.

$$\Delta\sigma_{combine} = F(\Delta\sigma_{thickness}, \Delta\sigma_{in\text{-}plane}) \quad (1)$$

The index value is, for example, an average value of the above two stress gradients, as in the following Equation (2):

$$\Delta\sigma_{combine} = (\Delta\sigma_{thickness} + \Delta\sigma_{in\text{-}plane})/2 \quad (2)$$

It has been found that a crack that occurs from the end face 10A correlates with the two stress gradients in the sheet thickness direction X and the in-plane direction in the vicinity Z of the crack occurrence portion. Furthermore, as in Equation (3), the index value $\Delta\sigma_{combine}$ comprising a square root value of the sum of squares of the gradients in the two directions highly correlates with cracking of the end face 10A. Thus, with use of the index value calculated by Equation (3), deformation limit evaluation and end face crack prediction of the sheared end face 10A can be performed with high accuracy.

$$\Delta\sigma_{combine} = \sqrt{((\Delta\sigma_{thickness})^2 + (\Delta\sigma_{in\text{-}plane})^2)} \quad (3)$$

Additionally, as a simple method, a sum of the two stress gradients in the sheet thickness direction X and the in-plane direction Y may be used as an index value, as in Equation (4):

$$\Delta\sigma_{combine} = \Delta\sigma_{thickness} + \Delta\sigma_{in\text{-}plane} \quad (4)$$

Herein, the above-mentioned Equation (2) is an example of a case when obtaining an index value from the two stress gradients, the two stress gradients are averaged by simple averaging. From the viewpoint that, in the case of bending, the stress gradient in the sheet thickness direction X more highly contributes to evaluation of cracking, each stress gradient may be weighted in accordance with bending deformation to obtain an index value, as in Equation (5).

$$\Delta\sigma_{combine} = (a \times \Delta\sigma_{thickness} + b \times \Delta\sigma_{in\text{-}plane}) \quad (5)$$

Herein, "a" and "b" represent weighting factors, and in the case of bending, the relationship of a>b is set. For example, it is set to a=1.3 and b=0.7. In the case of simple tensile deformation, for example, the relationship of a<b is set. For example, it is set to a=0.7 and b=1.3.

Similarly, also in Equation (3) and Equation (4), the two stress gradients may be weighted as mentioned above.
(Regarding Method for Calculating Stress Gradients in Vicinity of Crack Occurrence Portion)

Each stress gradient is calculated, for example, as follows.

For example, the stress gradients of the crack occurrence portion are obtained by an FEM analysis result of forming conditions in crack determination. As the stress gradients of the crack occurrence portion, stress gradients in two directions: the sheet thickness direction X and the in-plane direction that is the normal direction of the sheared end face 10A of a finite element model of a test piece are obtained from a finite element whose deformation limit strain has been obtained. The range for obtaining the stress gradients is set to a crack length that is a crack determination criterion. Note that the range for calculating the gradients is preferably 10 mm or less, and more preferably 5 mm or less.

Herein, when the press forming is a press forming including a bending deformation that forms a bending ridge line extending in the direction away from the sheared end face 10A (the first bending ridge line), for example, the gradient of the surface stress distribution in the direction away from the sheared surface may be a gradient of a surface stress distribution in a direction parallel to the direction of the first bending ridge line on the bending outer surface of the metal sheet. In this case, if at least one other bending ridge line different from the first bending ridge line is present within a range for evaluating the gradient of the surface stress distribution in the direction parallel to the first bending ridge line, it is preferable to calculate the gradient of the surface stress distribution at a distance up to less than an intersection closest to the sheared surface among intersections between the direction parallel to the first bending ridge line and the at least one other bending ridge line. The reason for that is that the intersection between the two bending ridge lines exhibits high stress by deformation due to protruding deformation, and influence of a portion beyond the intersection on the deformation limit of the sheared end face is very small with respect to the sheared end face. Additionally, the intersection between the direction parallel to the first bending ridge line (except for the first bending ridge line direction) and the other bending ridge line exhibits locally higher stress than at positions less than the intersection. Thus, even in the direction parallel to the first bending ridge line (except for the first bending ridge line direction), the gradient of the surface stress distribution is preferably calculated within the range of a distance up to less than the intersection.

As each stress gradient, it is desirable to obtain equivalent plastic strains from the FEM analysis result, and calculate equivalent stresses by using an equivalent stress-equivalent plastic strain relationship of the metal sheet 1 to obtain an average gradient thereof. By doing this, the stress gradient in the sheet thickness direction X and the stress gradient in the in-plane direction are calculated on the basis of a position where deformation limit strain is obtained.

In this way, the two surface strains in the sheet thickness direction X and the direction away from the sheared end face are calculated by forming simulation, and then, the stress gradient in the sheet thickness direction X and the stress gradient in the direction away from the sheared end face are obtained from the calculated each surface strain.

Herein, the surface strains for obtaining the stress gradients may be obtained by actually conducting a forming test.

Then, the above-described index value is calculated that comprises the combined stress gradient simultaneously considering the stress gradients in the sheet thickness direction X and the in-plane direction.

Herein, on the basis of the FEM analysis result of forming conditions and the like, a position where a crack is expected to occur when the end face deforms is set as an evaluation position.

(Method for Calculating Deformation Limit Strain)

To determine the deformation limit of the sheared end face 10A, it is necessary to prepare a test piece including the sheared end face 10A and conduct two or more kinds of tests in which stress gradients occurring during deformation are different.

Desirable testing methods are a V-shaped bending test in which the stress gradient in the vicinity of the sheared end face 10A during deformation is large and a notch tensile test in which the stress gradient in the vicinity of the sheared end face 10A during deformation is small. However, any testing method can be conducted as long as test pieces including the sheared end face 10A formed under the same conditions can be subjected to deformations with different stress gradients and the tests can be reproduced by an FEM analysis that will be described later.

Before starting the tests, a crack determination criterion for each forming test is determined. The method for determining the crack determination criterion is not particularly limited, and any determination criterion may be used. Examples of the determination method include a method of prescribing a crack length for crack determination, a method of prescribing a ratio of crack length to sheet thickness, and a method of determining a crack by crack penetration in the sheet thickness direction X.

After conducting each forming test, the length of a crack that has occurred at the sheared end face 10A is measured to obtain a relationship between crack length and forming conditions.

Next, FEM analysis is conducted under the same conditions. In the analysis result, a maximum principal strain is obtained from the finite element of the crack occurrence portion of the sheared end face 10A and a relationship between the maximum principal strain on the crack occurrence portion of the sheared end face 10A and forming conditions is obtained. A maximum principal strain under the forming conditions in the crack determination described above is obtained, and then defined as deformation limit strain. In this way, the deformation limit strain is calculated.

(Relationship Between Deformation Limit Strain and Stress Gradient in Vicinity of Crack Occurrence Portion)

Figure 3:
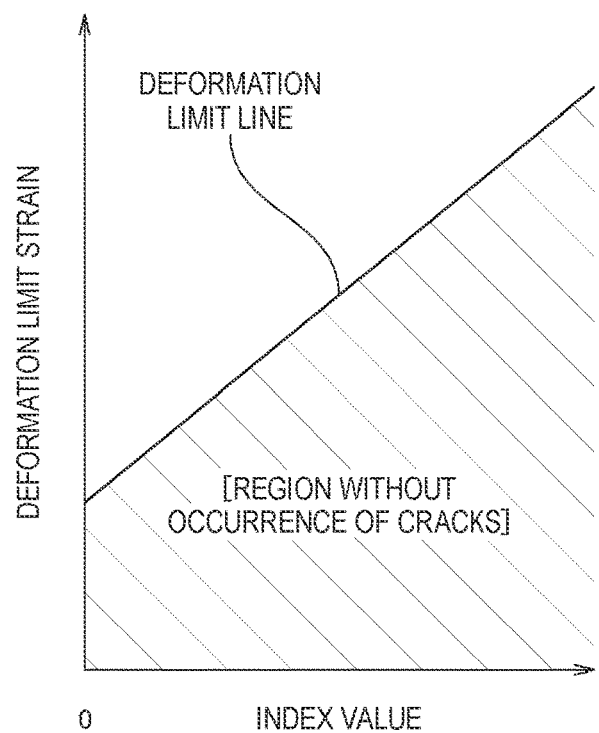
FIG. 3 is a diagram illustrating one example of a deformation limit line and a region without occurrence of any crack on a sheared end face.

With the above-described method, the relationship between deformation limit strain and stress gradient in the vicinity of the crack occurrence portion in each forming test is obtained. Then, from results of the two or more tests, a relational equation of linear approximation represented by Equation (6) is obtained, and set as a deformation limit line of the sheared end face 10A, as illustrated in FIG. 3.

$$\varepsilon_{lim} = A \times \Delta\sigma_{combine} + B, \quad B \geq 0 \tag{6}$$

In the equation, A and B are material constants.

Note that while this embodiment is an example in which deformation limit strain is set on the vertical axis, another variable correlating with the index value may be set on the vertical axis. Examples of the other variable include tension. Additionally, the deformation limit strain is not particularly limited to one defined by the maximum principal strain as described above. For example, the deformation limit strain may be one defined by an equivalent plastic strain.

(Method for Determining Crack on Sheared End Face 10A at Time of Press Forming)

An FEM analysis of press forming is conducted to calculate a maximum principal strain $\varepsilon_{edge}$ of the sheared end face 10A at the evaluation position where crack determination is desired, the stress gradient $\Delta\sigma_{thickness}$ in the sheet thickness direction X, and the stress gradient $\Delta\sigma_{in\text{-}plane}$ in the in-plane direction. In addition, as described above, the deformation limit strain $\varepsilon_{lim}$ at the index value $\Delta\sigma_{combine}$ is calculated, and a comparison is made between the maximum principal strain $\varepsilon_{edge}$ and the deformation limit strain $\varepsilon_{lim}$ of the sheared end face 10A at the evaluation position where crack determination is desired, thereby determining a crack. Specifically, a prediction (determination) is made that a crack occurs when satisfying the condition of Equation (7):

$$\varepsilon_{edge} \geq \varepsilon_{lim} \tag{7}$$

(Regarding Sheared End Face 10A by Shearing)

Herein, a description will be given of the sheared end face 10A after shearing.

Shearing is a method for separating the metal sheet 1 into two or more pieces by subjecting the metal sheet 1 to shear deformation using a pair of a punch and a die to cause cracking.

In the present embodiment, the metal sheet 1 including the sheared end face 10A is produced by shearing into a predetermined outline shape through an ordinary shearing process.

Although properties of the sheared end face 10A subjected to shearing vary in accordance with a clearance that is a distance between the punch and the die, the present embodiment is not limited to the properties of the end face. However, the clearance is preferably set within a range of from 5 to 20% of the sheet thickness of the metal sheet 1 where processing load is low and thereby damage to the punch and the die is reduced. Particularly, a range of from 8 to 15% is preferably set for a steel sheet having a tensile strength of 590 MPa or more. In addition, there is also a method of widely forming the sheared end face 10A by shearing with a clearance of 5% or less. However, shearing may be performed by any method to produce the test piece (the metal sheet 1) to be evaluated.

(Operation and Others)

According to the present embodiment, the deformation limit of the sheared end face 10A of the metal sheet 1 necessary to press form the target metal sheet 1 can be accurately evaluated and predicted.

As a result, according to the present embodiment, an accurate prediction can be made as to whether or not the metal sheet 1 for use in press forming various parts such as panel parts and structural/framework parts of an automobile is appropriately selected. Then, according to the present embodiment, stable press forming can be performed, as well as a great contribution can be made to reduction in defect rates of press formed articles. Furthermore, according to the present embodiment, the shape of the press die can be accurately predicted at a designing stage, which can contribute to shortening of a press die manufacturing period.

In general, the metal sheet 1 having high strength is low in ductility, so that deforming the sheared end face 10A of the metal sheet 1 easily causes cracking. Thus, the present invention is more effective as the metal sheet 1 having higher strength is used. Specifically, the invention is preferably directed to the metal sheet 1 having a tensile strength of 590 MPa or more, and more preferably to the metal sheet 1 having a tensile bending strength of 980 MPa or more. In addition, a type of the metal sheet 1 that is to be mass-produced, as in press forming, is an advantageous target in terms of cost, and it is preferable to target the metal sheet 1, and particularly a steel sheet.

EXAMPLES

Example 1

Next, Examples based on the present invention will be described.

As test pieces, three kinds of test materials A, B, and C depicted in Table 1 were used. Table 1 gives material characteristics of each test material.

TABLE 1

| Test material | Yield stress YS [MPa] | Tensile strength TS [MPa] | Elongation El [%] | Sheet thickness [mm] |
|---|---|---|---|---|
| A | 924 | 1285 | 11.5 | 1.4 |
| B | 985 | 1194 | 16.6 | 1.2 |
| C | 1183 | 1353 | 8.1 | 1.6 |

A punched hole was formed in each test material, and then the each test material was formed by cutting into a predetermined test piece shape. The punching clearance is preferably from 5% to 20% of the sheet thickness. In the case of a clearance less than 5% thereof, a secondary sheared surface can be formed, whereas in the case of a clearance more than 20% thereof, formation of burrs can be noticeable. Additionally, the secondary sheared surface and the noticeable burrs are not preferable since they serve as an origin of occurrence of a crack, and thereby destabilize and reduce moldability of the end face. This is also not preferable as a clearance in mass production of parts. For stable moldability, the clearance is more preferably set in a narrower range of from 10% to 15%.

Figure 4:
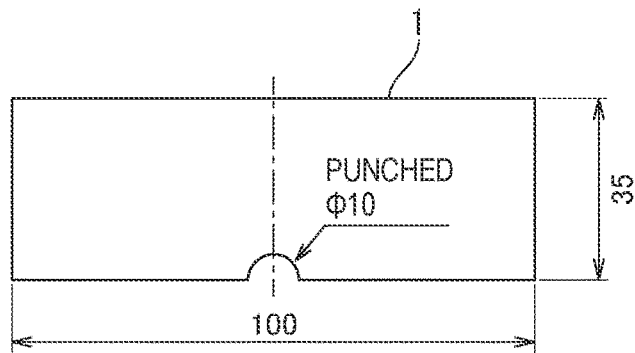
FIG. 4 is a diagram illustrating the shape of a test piece in a V-shaped bending test.
Figure 5:
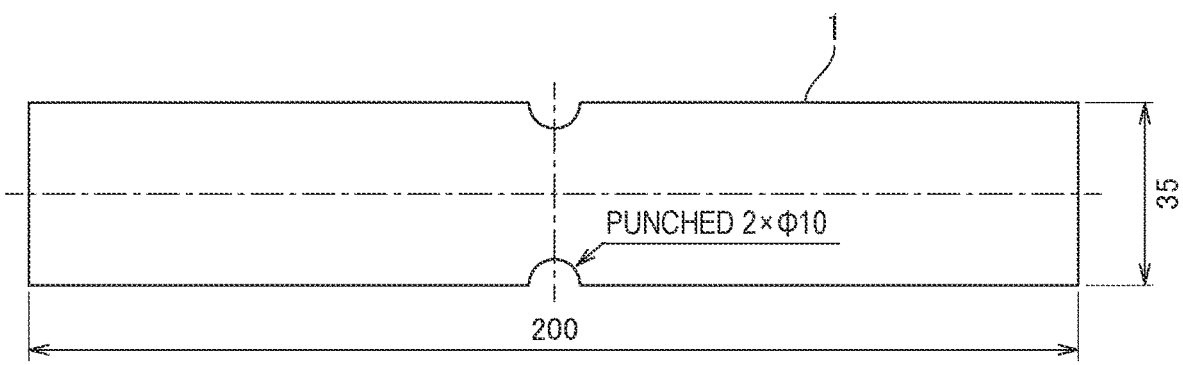
FIG. 5 is a diagram illustrating the shape of a test piece in a notch tensile test.

FIG. 4 illustrates a test piece shape for a V-shaped bending test, and FIG. 5 illustrates a test piece shape for a notch tensile test. Additionally, the dimensional unit given in each drawing is mm.

Figure 6:
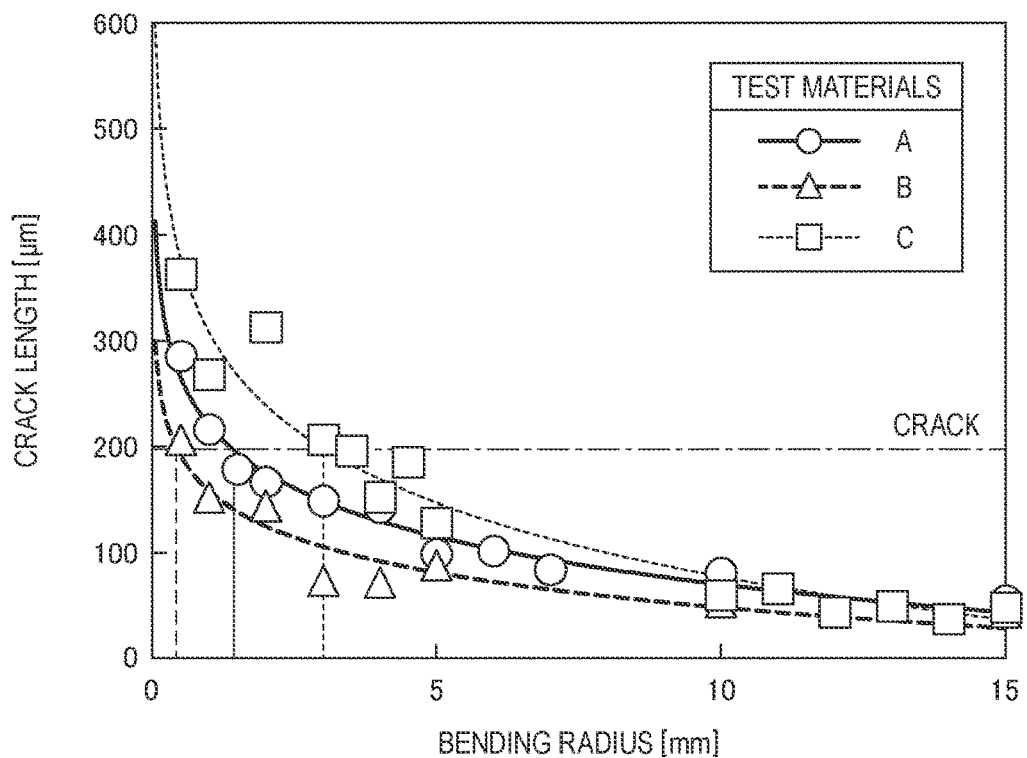
FIG. 6 is a diagram illustrating relationships between crack length and bending radius in the V-shaped bending test.
Figure 7:
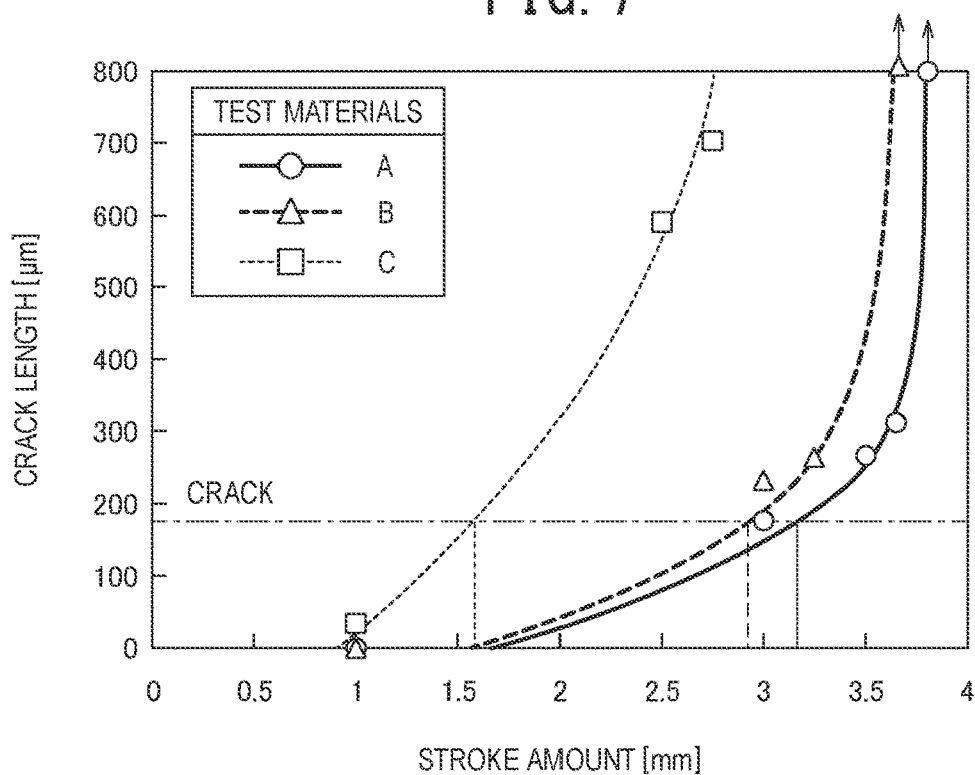
FIG. 7 is a diagram illustrating relationships between crack length and stroke amount in the notch tensile test.

The test pieces of FIG. 4 and FIG. 5 were subjected to the V-shaped bending test and the notch tensile test to obtain relationships between crack lengths of the sheared end face 10A and forming conditions, as in FIG. 6 and FIG. 7.

In the present Example, test results of crack lengths of 200 µm or more were determined to be cracks. However, as described above, the determination criterion can be optionally determined, and there is no restriction due to crack length. The crack length for the determination criterion may be set to 100% of the sheet thickness or 50% thereof. Note that, to reduce the defect rate of a target pressed part, it is better to determine a shorter crack length as a crack. In this case, 50% or less of the sheet thickness is preferable, and 30% or less thereof is more preferable.

With the crack determination, forming conditions at the time of crack determination in each test were determined.

Figure 8:
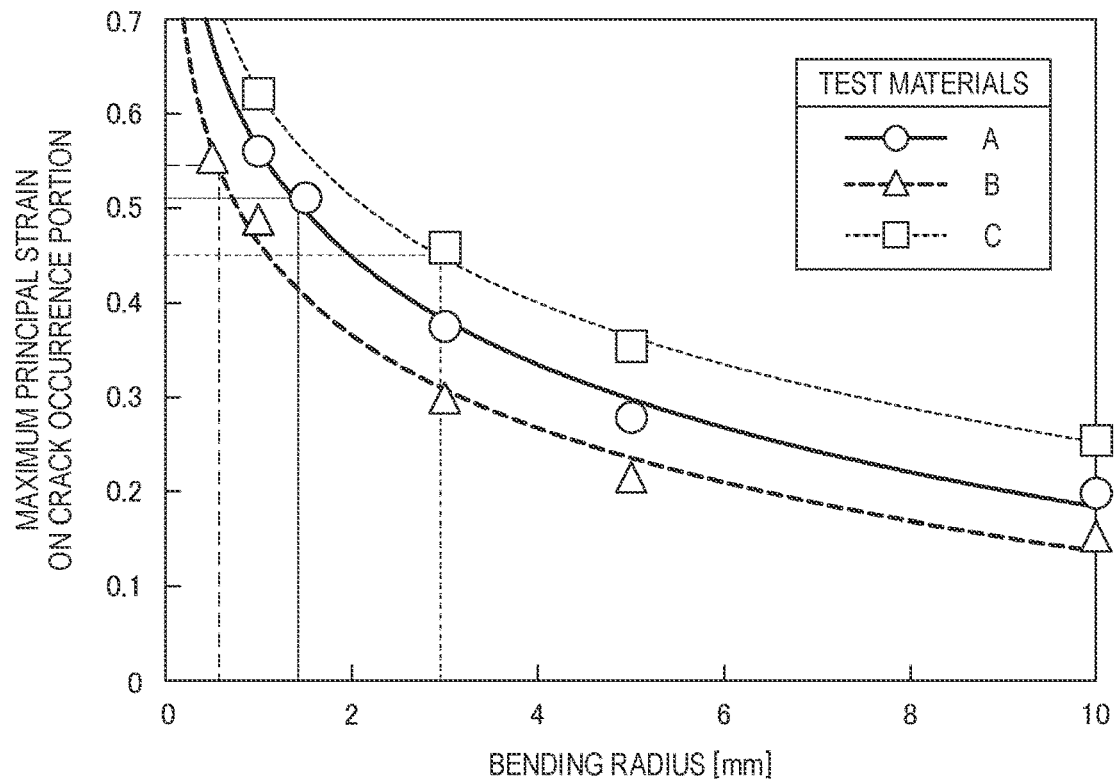
FIG. 8 is a diagram illustrating relationships between maximum principal strain on a crack occurrence portion and bending radius obtained by an FEM analysis of the V-shaped bending test.
Figure 9:
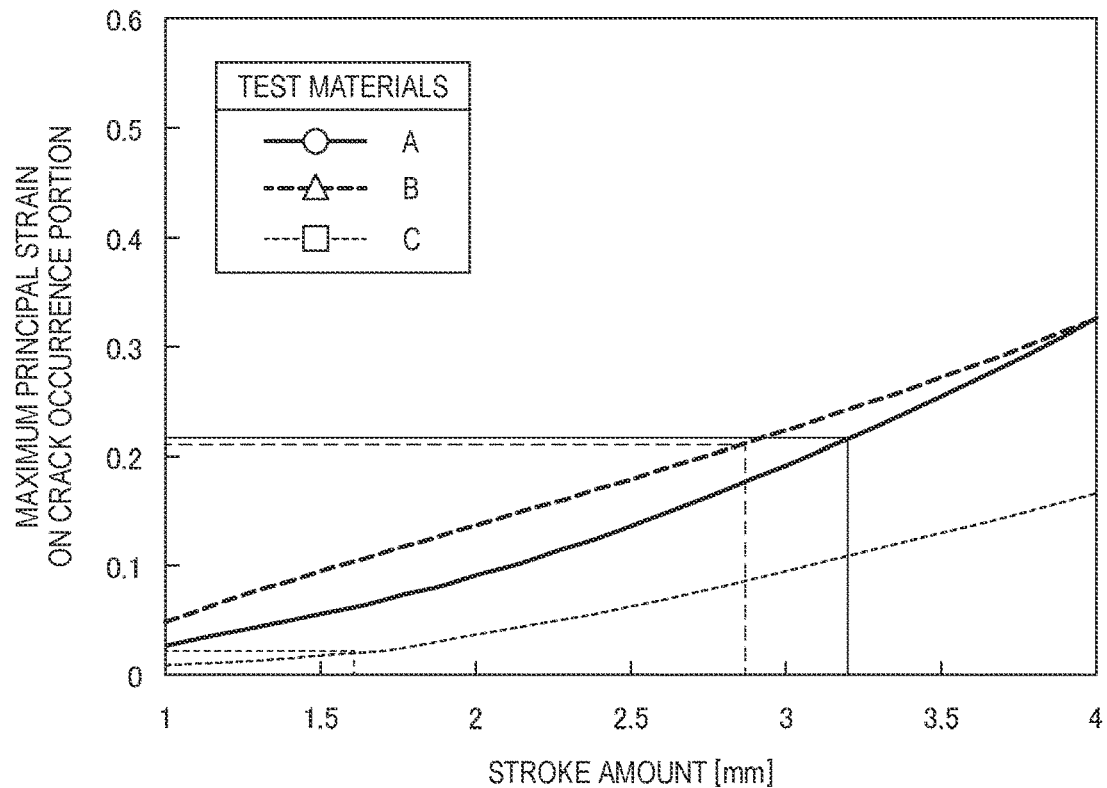
FIG. 9 is a diagram illustrating relationships between maximum principal strain on a crack occurrence portion and bending radius obtained by an FEM analysis of the notch tensile test.

Next, through an FEM analysis reproducing the each test, relationships between surface strains and forming conditions, as in FIG. 8 and FIG. 9, were obtained. Table 2 depicts the obtained results regarding deformation limit strains under the crack determination conditions of the V-shaped bending test and the notch tensile test.

TABLE 2

| | Deformation limit strain $\varepsilon_{limit}$ | |
|---|---|---|
| Test material | V-shaped bending test | Notch tensile test |
| A | 0.51 | 0.21 |
| B | 0.55 | 0.21 |
| C | 0.46 | 0.02 |

Figure 10:
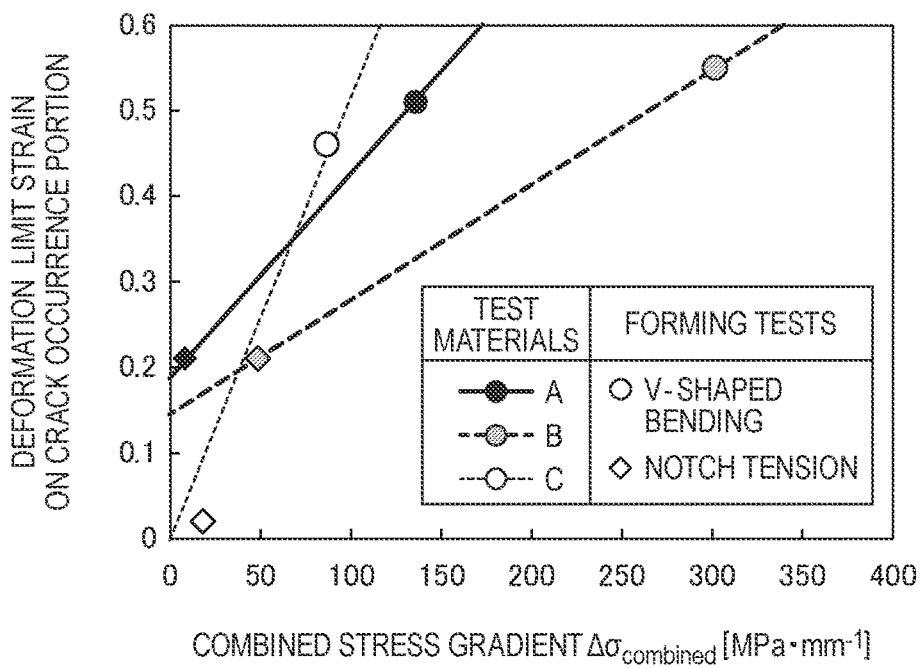
FIG. 10 is a diagram illustrating relationships between deformation limit strain on the crack occurrence portion and combined stress gradient (index value based on the present invention) obtained from the V-shaped bending test and the notch tensile test.

Furthermore, from the FEM analysis results under the forming conditions at the time of the crack determination, stress gradients in the sheet thickness direction X in the vicinity of the crack occurrence portion and the in-plane direction that is the normal direction of the sheared end face 10A were obtained to obtain a relationship between deformation limit strain and combined stress gradient as index value in the vicinity of the crack occurrence portion (use of Equation (3)), the result of which is depicted in FIG. 10.

From the result of FIG. 10, the presence or absence of occurrence of a crack on the sheared end face 10A can be predicted by reproducing other forming conditions through an FEM analysis and obtaining strains and stress gradients of the sheared end face 10A.

Figure 11:
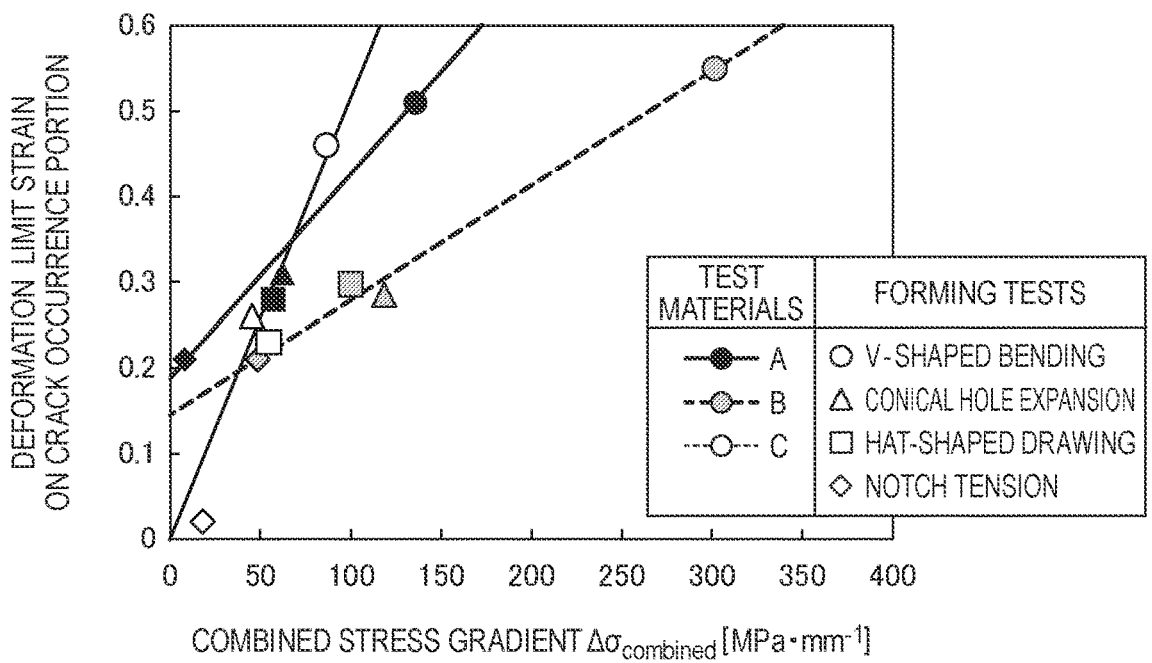
FIG. 11 is a diagram illustrating relationships between deformation limit strain on the crack occurrence portion and combined stress gradient (index value based on the present invention) in each forming test.

As one example, FIG. 11 illustrates a result obtained by superimposing, on FIG. 10, relationships between deformation limit strains and stress gradients in the vicinity of a crack occurrence portion at the time of deformation limit in a conical hole expansion test and a hat-shaped drawing test.

As can be seen in FIG. 11, the deformation limit of each test is positioned in the vicinity of the relationship between deformation limit strain and stress gradient, indicating that a crack limit can be predicted with high accuracy.

Verification of Usefulness of Example

Comparative Example 1

Figure 12:
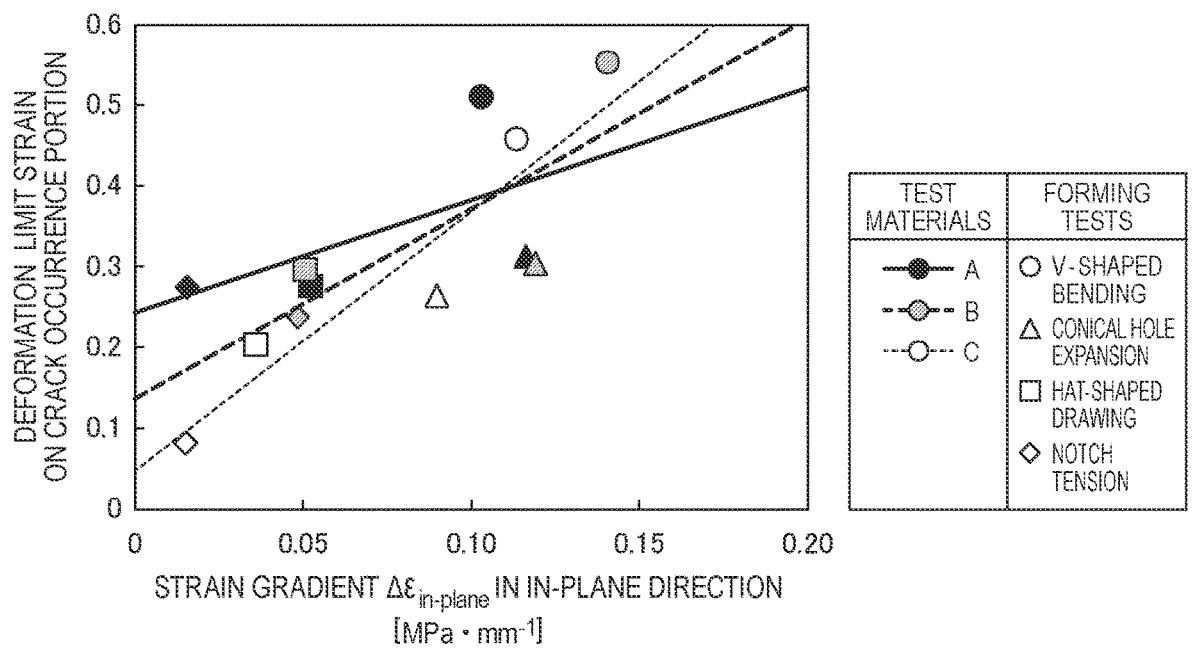
FIG. 12 is a diagram illustrating relationships between deformation limit strain on the crack occurrence portion and strain gradient in the in-plane direction in each forming test.

FIG. 12 illustrates a result obtained by summing up relationships between deformation limit strain and strain gradient $\Delta\varepsilon_{in\text{-}plane}$ in the sheet in-plane direction.

FIG. 12 indicates that directly adopting the method of PTL 1 using the strain gradient $\Delta\varepsilon_{in\text{-}plane}$ in the sheet in-plane direction reduces prediction accuracy.

Comparative Example 2

Figure 13:
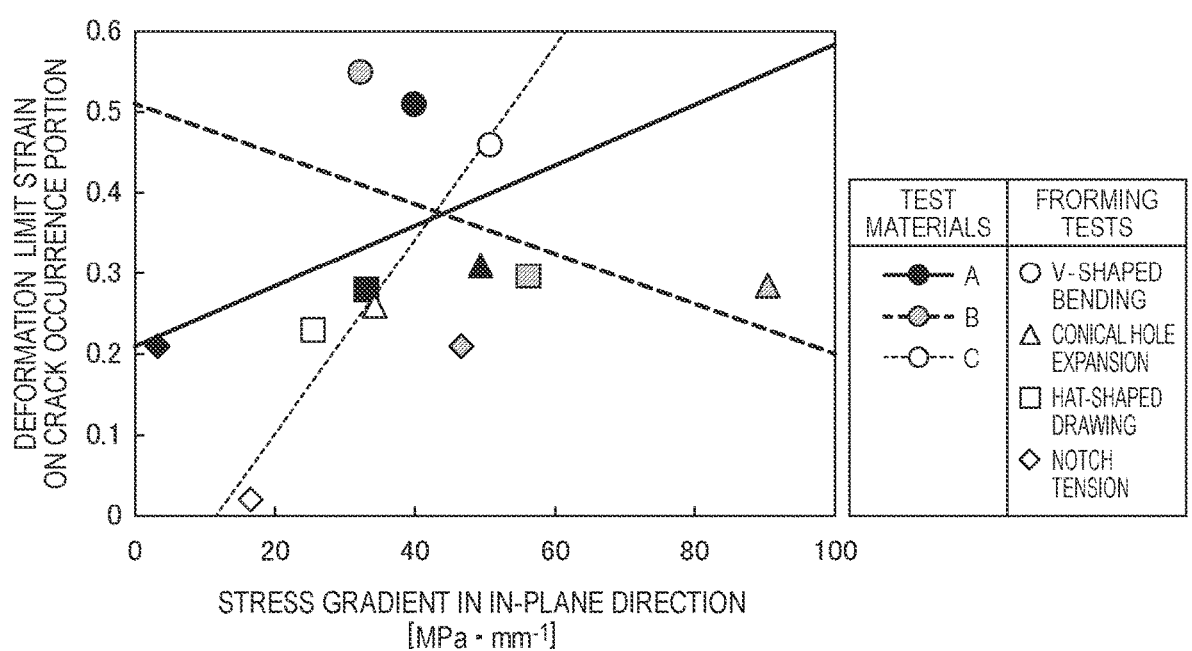
FIG. 13 is a diagram illustrating relationships between deformation limit strain on the crack occurrence portion and stress gradient in the in-plane direction in each forming test.

FIG. 13 illustrates a result obtained by summing up relationships between deformation limit strain and stress gradient $\Delta\sigma_{in\text{-}plane}$ in the sheet in-plane direction.

FIG. 13 indicates that directly adopting the method of PTL 1 using the stress gradient $\Delta\sigma_{in\text{-}plane}$ in the sheet in-plane direction reduces prediction accuracy.

It can be seen that, as described above, the deformation limit evaluation method and the crack prediction method according to the present invention are more accurate than Comparative Examples 1 and 2.

The present Example has described the example of application of steel sheets having a tensile strength of 980 MPa class or more, and the present invention is preferably applied to press forming of such high-strength steel sheets, but not limited to the above materials. The invention can also be widely applied to metal sheets 1, such as steel sheets having a tensile strength of 590 MPa class or more and aluminum sheets.

The entire contents of Japanese Patent Application No. 2017-184706 (filed on Sep. 26, 2017) to which the present application claims priority are made a part of the present disclosure by reference. While the present invention has been described with reference to the limited number of embodiments, the scope of the invention is not limited thereto, and modifications of the respective embodiments based on the above disclosure are obvious to those skilled in the art.

REFERENCE SIGNS LIST

1: Metal sheet
1B: Bending ridge line (first bending ridge line)
10: Formed article
10A: Sheared end face (sheared surface)
X: Sheet thickness direction
Y: Direction away from sheared end face (in-plane direction)

The invention claimed is:

1. A method for manufacturing a press die, the method comprising:
   obtaining an index value from gradients of two surface stress distributions at an evaluation position among stress distributions occurring in a vicinity of a sheared surface of a metal sheet due to press forming, wherein:
   the gradients of the two surface stress distributions are:
      a gradient of a surface stress distribution in a sheet thickness direction; and
      a gradient of a surface stress distribution in a direction away from the sheared surface; and
   the evaluation position is a position where a crack is expected to occur when an end face of the metal sheet deforms;
   calculating a deformation limit from a relationship between the index value at the evaluation position and a deformation limit strain on the sheared surface; and
   manufacturing a press die configured to suppress occurrence of a crack on the end face of the metal sheet by using the deformation limit.

2. The method of claim 1, wherein the index value is defined as one of the following values:
   a simple average value of the gradients of the two surface stress distributions;
   a root mean square of the gradients of the two surface stress distributions;
   a sum of the gradients of the two surface stress distributions; or
   a weighted average value of the gradients of the two surface stress distributions.

3. The method of claim 1, wherein the index value is defined as a root mean square of the gradients of the two surface stress distributions.

4. The method of claim 1, wherein the index value is defined as a sum of the gradients of the two surface stress distributions.

5. A method for manufacturing a press die for press forming a metal sheet by bending deformation thereby forming a bending ridge line extending in a direction away from a sheared surface of the metal sheet, the method comprising:
   evaluating, at a bending position on an end face of a sheared surface of a metal sheet, two surface stress distributions among stress distributions occurring in a vicinity of the sheared surface of the metal sheet due to press forming during forming simulation, the gradients of the two surface stress distributions including:
      a gradient of a surface stress distribution in a sheet thickness direction $\Delta\sigma_{thickness}$; and
      a gradient of a surface stress distribution in a direction parallel to the direction of the bending ridge line on a bending outer surface of the metal sheet $\Delta\sigma_{in\text{-}plane}$;
   calculating an index value $\Delta\sigma_{combine}$ according to one of the following Equations (2)-(5):

$$\Delta\sigma_{combine} = (\Delta\sigma_{thickness} + \Delta\sigma_{in\text{-}plane})/2; \tag{2}$$

$$\Delta\sigma_{combine} = \sqrt{((\Delta\sigma_{thickness})^2 + (\Delta\sigma_{in\text{-}plane})^2)}; \tag{3}$$

$$\Delta\sigma_{combine} = \Delta\sigma_{thickness} + \Delta\sigma_{in\text{-}plane}; \text{ or} \tag{4}$$

$$\Delta\sigma_{combine} = (a \times \Delta\sigma_{thickness} + b \times \Delta\sigma_{in\text{-}plane}), \tag{5}$$

wherein "a" and "b" are weighting factors, and a>b;
   measuring a deformation limit strain $\varepsilon_{limit}$ by subjecting the end face to two or more tests in which stress gradients occurring during deformation are different, wherein the deformation limit strain $\varepsilon_{limit}$ is defined as a maximum principal strain or a maximum equivalent plastic strain on the sheared surface;
   calculating a deformation limit relationship between the index value $\Delta\sigma_{combine}$ and the deformation limit strain $\varepsilon_{limit}$ according to the following Equation (6):

$$\varepsilon_{limit} = A \times \Delta\sigma_{combine} + B, \tag{6}$$

wherein "A" and "B" are material constants, and B≥0; and
   manufacturing a press die having a press die shape designed to minimize the principal strain or equivalent plastic strain on the sheared surface during press forming according to the deformation limit relationship, thereby suppressing occurrence of a crack on the end face of the metal sheet.

6. The method of claim 5, wherein the two or more tests are selected from the group consisting of:
   V-shaped bending;
   conical hole expansion;
   hat-shaped drawing; and
   notch tension.

7. The method of claim 5, wherein the press die shape of the manufactured press die has a bending radius that is larger than a test bending radius at which the deformation limit strain $\varepsilon_{limit}$ was measured by the two or more tests.

* * * * *